2,891,915
ORGANOPHOSPHORUS POLYMERS

William Brewster McCormack, Elsmere, Del., and Herman Elbert Schroeder, Kennett Square, Pa., assignors to E. I. du Pont de Nemours and Company, Wilmington, Del., a corporation of Delaware No Drawing. Application July 2, 1954
Serial No. 441,168

3 Claims. (Cl. 260—2)

This invention relates to a new class of polymers and more particularly to new organophosphorus polymers useful as flame-retardants for synthetic fibers.

The use of phosphorus containing materials as flame-retardants has been known for a long time; however, these materials possess certain serious disadvantages and are not suitable for use on synthetic fibers. The problem was therefore presented of providing suitable flame-retardant compounds for synthetic fibers which possess the desired properties, i.e., ability of being incorporated into the melt or spinning solution of the fiber polymer with no deleterious effect on the properties of the resulting flame-proofed fiber and the possession of a high degree of durability.

This invention has as an object to provide a new class of organophosphorus polymers, a further object is to provide organophosphorus polymers which are effective and durable flame-retardant agents. Other objects will appear hereinafter.

These and other objects are accomplished by the following invention of organophosphorus polymers containing in the polymer chain the recurring structural unit

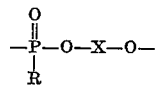

wherein R is a radical selected from the group consisting of straight chain or branched lower alkyl of from 1 to 3 carbons and monochloromethyl alkyl and X is the nucleus of an active hydrogen compound selected from the group consisting of aliphatic diols, cycloalkyl diols and bis-hydroxyphenyl alkanes. These polymers are all of reasonably high molecular weight in that there are at least five of the above identified recurring structural units present in the polymer chain. These polymers can be conveniently prepared by the reaction of the appropriate active hydrogen compound with either a phosphonyl dichloride of the type $RPOCl_2$ wherein R has the value defined above or a dialkyl phosphonate of the type $RPO(OR')_2$ wherein R has the value defined above and R' is lower alkyl.

In preparing the polymers with the appropriate active hydrogen compound and the phosphonyl dichloride approximately equimolar quantities of the reactants are heated until the condensation is complete. A suitable diluent or reaction medium may be used so long as it is inert to the reactants and hydrogen chloride and does not react with the reactants or resulting polymer under the conditions employed. Examples of diluents which may be used are decalin o-dichlorobenzene and diphenyl, etc. The hydrogen chloride formed by this process may be allowed to escape from the reaction mixture as a gas or it may be absorbed in situ by the addition of an equivalent quantity of a non-aqueous base such as pyridine, dimethylaniline, triethylamine, etc.

In preparing the polymers of the present invention by the ester interchange procedure, approximately equimolar quantities of the active hydrogen compound and the dialkyl phosphonate are heated so that the alkyl alcohol corresponding to the phosphonate ester are distilled from the reaction mass. Generally, this requires heating to temperatures in the range of about 150 to 300° C. for periods of about one to four hours. The polymers are then obtained by subjecting the hot reaction mass to reduced pressures in the range of 1 to 5 mm. Hg so as to allow any low molecular weight product, by-products, unreacted starting materials and any traces of diluents which may have been used to distill away from the polymer. Generally, these materials which distill away from the product are referred to as "light ends." When this distillation has ceased, the vacuum is broken and the hot product polymer is poured from the reaction flask into a suitable container where it thickens to a syrup or glass-like solid.

The following examples will better illustrate the nature of the present invention; however, the invention is not intended to be limited to these examples.

EXAMPLE I

*Polyethylphosphonate of 2,2-bis(4-hydroxyphenyl)-propane*

20 grams of ethylphosphonyl dichloride and 31 grams of diphenylolpropane were heated rapidly under an efficient reflux condenser. Copious evolution of HCl occurred at 150–200° C. Heating was continued to 300° C. at which temperature a vacuum of 2 mm. was applied. When gassing had ceased, the polymer was cooled to obtain a light-colored glass soluble in acetone and alcohol, but not in water.

*Analysis.*—Calc'd. for $(C_{17}H_{19}PO_3)_n$: P, 10.25. Found: P, 10.1, 10.2.

EXAMPLE II

*Polychloromethylphosphonate of 2,2-bis(4-hydroxyphenyl)propane*

A mixture of 16.75 g. of chloromethylphosphonyl dichloride and 22.8 g. of diphenylolpropane was heated under an efficient reflux condenser. Much HCl was evolved at 200–205° C. Heating was continued to 275° C., and the reaction mass was held at this temperature and 1 mm. absolute pressure for one-half hour. The resulting polymer was cooled to obtain a light-colored glass, soluble in dimethylformamide and insoluble in water.

*Analysis.*—Calc'd. for $(C_{16}H_{16}PO_3Cl)_n$: P, 9.6; Cl, 11.0. Found: P, 10.0; 9.8; Cl, 11.5; 11.4.

EXAMPLE III

A. *Polymethylphosphonate of 2,2-diethyl-1,3-propanediol*

A solution of 18.66 g. of dimethyl methylphosphonate and 19.9 g. of 2,2-diethyl-1,3-propanediol was heated under a short distillation column for 5 hours at 240–260° C. A total of 8 ml. of distillate was collected. The pressure in the apparatus was reduced to 5 mm. Hg and the "light ends" removed under these conditions. The residue was a light-colored syrup.

*Analysis.*—Calc'd. for $(C_6H_{13}PO_3)_n$: P, 18.9. Found P, 19.5, 19.5.

$$CH_3O-\underset{\underset{CH_3}{|}}{\overset{\overset{O}{\|}}{P}}-OCH_3 + HO-CH_2\underset{\underset{C_2H_5}{|}}{\overset{\overset{C_2H_5}{|}}{C}}CH_2OH \longrightarrow$$

$$\left[ -\underset{\underset{CH_3}{|}}{\overset{\overset{O}{\|}}{P}}-OCH_2\underset{\underset{C_2H_5}{|}}{\overset{\overset{C_2H_5}{|}}{C}}CH_2O- \right]_n$$

B. *Polyethylphosphonate of 2,2-dimethyl-1,3-propanediol*

When this procedure is repeated,, using the corresponding molar amounts of ethyl dimethylphosphonate and 2,2-dimethyl-1,3-propanediol, the polyethylphosphonate of 2,2-dimethyl-1,3-propanediol is obtained.

EXAMPLE IV

A. Poly-tetramethylene ethylphosphonate

A solution of 25 g. of 1,4-butanediol, 50 g. of pyridine and 500 ml. of benzene was dried by refluxing into a Dean-Stark water separator and then cooled to 5–10° C. Ethylphosphonyl dichloride (40 g.) was added dropwise with stirring at this temperature and the resulting reaction mixture stirred for three hours at 5–10° C. and then overnight at room temperature. The pyridine hydrochloride was separated by filtration and the filtrate concentrated under reduced pressure to an oil. "Light ends" were removed at 250° C. and 0.8 mm. resulting in a light-colored syrup, soluble in water, methyl and ethyl alcohols, benzene, chloroform and acetone.

Analysis.—Calc'd. for $(C_6H_{13}PO_3)_n$: P, 18.9. Found P, 19.2, 19.3.

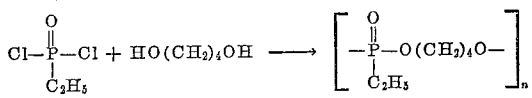

B. Poly-tetramethylene isopropylphosphonate

When the procedure of Example IV A is repeated using the corresponding molar amount of isopropylphosphonyl dichloride, the corresponding polymer is produced.

EXAMPLE V

POLY-ETHYLENE ISOPROPYLPHOSPHONATE

A. From isopropylphosphonyl dichloride

A mixture of ethyleneglycol (6.1 g.) and isopropylphosphonyl dichloride (15.5 g.) was heated slowly at atmospheric pressure. Considerable HCl was evolved at 100–125° C. The heating was continued to 300° C. at such a rate that the total time was 1.5 hours.

After removal of by-products distilling up to 76° C./1 mm., the polymer was isolated as a heavy syrup which barely flowed at room temperature. It contained 22.5% P.

B. From dimethyl isopropanephosphonate

This polymer was also prepared by heating a mixture of 5.0 g. of dimethyl isopropanephosphonate and 2.05 g. of ethylene glycol at 300° C./1 mm. until evolution of methanol ceased. The product was a light-brown viscous oil.

POLY-ETHYLENE ETHYLPHOSPHONATE

When ethyl phosphonyl dichloride is substituted for isopropylphosphonyl dichloride in the procedure of Example V A, the corresponding polymers are produced.

POLY-ETHYLENE MONOCHLOROMETHYLPHOSPHONATE

When monochloromethylphosphonyl dichloride is substituted for isopropylphosphonyl dichloride in the procedure of Example V A, the corresponding polymers are produced.

While the invention has been illustrated by means of a few limited active hydrogen reactants, it is to be understood that other active hydrogen compounds are operative, i.e., 1,3-propanediol; 2,2-dimethyl-1,3-propanediol; 1,5-pentanediol; 1,6-hexanediol; 1,3-cyclohexanediol; 1,4-cyclohexanediol, bis-(4-hydroxyphenyl) methane; 1,1-bis-(4-hydroxyphenyl) ethane, etc. The preferred active hydrogen compounds for the present invention are ethyleneglycol, 1,4-butanediol and 2,2-bis-4-hydroxyphenylpropane.

The organophosphorus polymers of the present invention are amber to brown in color, are syrupy to glass-like solids and have a wide variety of uses. They are sufficiently soluble in organic solvents to permit their use in the melts or spinning solution of fiber polymers. Thus, since they are flame-retardant agents, they are capable of flame-proofing synthetic fibers and at the same time, they do not adversely affect the fiber and they do possess a high degree of durability.

As many apparently widely different embodiments of this invention may be made without departing from the spirit and scope thereof, it is to be understood that this invention is not limited to the specific embodiments thereof except as defined in the appended claims.

What is claimed is:

1. A linear organophosphorus polymer having, as the polymer chain, the recurring structural unit

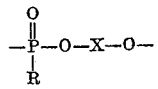

wherein R is a radical selected from the class consisting of straight chain and branched lower alkyl of from 1 to 3 carbons and monochloromethyl alkyl and X is an alkylene radical of 2 to 5 carbon atoms.

2. A linear organophosphorus polymer having, as the polymer chain, the recurring structural unit

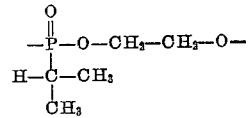

3. A linear organophosphorus polymer having, as the polymer chain, the recurring structural unit

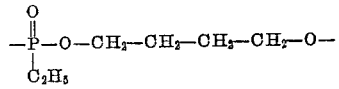

References Cited in the file of this patent

UNITED STATES PATENTS

| | | |
|---|---|---|
| 2,435,252 | Toy | Feb. 3, 1948 |
| 2,636,020 | Zenftman et al. | Apr. 21, 1953 |
| 2,714,100 | Toy et al. | July 26, 1955 |
| 2,716,100 | Coover et al. | Aug. 23, 1955 |
| 2,743,258 | Coover | Aug. 24, 1956 |